(12) United States Patent
Chono

(10) Patent No.: US 11,736,724 B2
(45) Date of Patent: *Aug. 22, 2023

(54) VIDEO ENCODING OR DECODING APPARATUS, VIDEO ENCODING OR DECODING METHOD, PROGRAM, AND RECORDING MEDIUM

(71) Applicant: NEC Corporation, Tokyo (JP)

(72) Inventor: Keiichi Chono, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/883,016

(22) Filed: Aug. 8, 2022

(65) Prior Publication Data

US 2022/0385927 A1   Dec. 1, 2022

Related U.S. Application Data

(63) Continuation of application No. 17/254,937, filed as application No. PCT/JP2019/005263 on Feb. 14, 2019.

(30) Foreign Application Priority Data

Jun. 26, 2018   (JP) ................. 2018-120872

(51) Int. Cl.
*H04N 19/593* (2014.01)
*H04N 19/105* (2014.01)
(Continued)

(52) U.S. Cl.
CPC ......... *H04N 19/593* (2014.11); *H04N 19/105* (2014.11); *H04N 19/159* (2014.11);
(Continued)

(58) Field of Classification Search
CPC .. H04N 19/593; H04N 19/105; H04N 19/159; H04N 19/167; H04N 19/176; H04N 19/1883; H04N 19/196; H04N 19/96
See application file for complete search history.

(56) References Cited

U.S. PATENT DOCUMENTS

2013/0022119 A1   1/2013   Chien et al.
2016/0241875 A1   8/2016   Wu et al.
(Continued)

FOREIGN PATENT DOCUMENTS

KR      20140039082 A     3/2014
KR   10-2022-0123324 A    9/2022
(Continued)

OTHER PUBLICATIONS

Korean Office Acton for KR Applicaton No. 10-2020-7036931 dated Dec. 9, 2021 with English Translation.
(Continued)

*Primary Examiner* — Tat C Chio
(74) *Attorney, Agent, or Firm* — Sughrue Mion, PLLC

(57) ABSTRACT

The problem when the use range of images for use in intra-prediction is expanded is that the requirement for line buffer size increases depending on the range of expansion, and, in order to solve this problem, the use range of imaged for use in intra-prediction is adaptively controlled. The intra-prediction apparatus 100 of the present invention has, a control section 115 that controls, based on the relationship between the position of a candidate image for use in intra-prediction for a block to be processed and the position of the unit where the block to be processed belongs, the partial range for use for intra-prediction beyond the end portion of the unit in a predetermined direction in the use range of the image for use for intra-prediction to be equal to or less than a predetermined maximum range.

9 Claims, 14 Drawing Sheets

(51) Int. Cl.
*H04N 19/167* (2014.01)
*H04N 19/176* (2014.01)
*H04N 19/169* (2014.01)
*H04N 19/159* (2014.01)
*H04N 19/196* (2014.01)
*H04N 19/96* (2014.01)

(52) U.S. Cl.
CPC ......... *H04N 19/167* (2014.11); *H04N 19/176* (2014.11); *H04N 19/1883* (2014.11); *H04N 19/196* (2014.11); *H04N 19/96* (2014.11)

(56) References Cited

U.S. PATENT DOCUMENTS

| | | |
|---|---|---|
| 2017/0272757 A1 | 9/2017 | Xu et al. |
| 2017/0347102 A1 | 11/2017 | Panusopone et al. |
| 2018/0063525 A1 | 3/2018 | Kim et al. |
| 2018/0302629 A1 | 10/2018 | Kondo |
| 2021/0006799 A1* | 1/2021 | Lee ............ H04N 19/159 |
| 2021/0136412 A1* | 5/2021 | Chono ............ H04N 19/11 |

FOREIGN PATENT DOCUMENTS

| | | |
|---|---|---|
| WO | 2013/012867 A2 | 1/2013 |
| WO | 2017/073362 A1 | 5/2017 |

OTHER PUBLICATIONS

M. Albrecht et al, "Desciption of SDR, HDR, and 360° video coding technology proposal by Fraunhofer HHI". JVET of ITU-T and ISO/IEC 10th Meeting, JVET-J0014 ver4, USA, Apr. 10-20, 2018.
Extended European Search Report for EP Application No. EP19825253.8 dated Jul. 9, 2021.
Teruhiko Suzuki et al., "Description of SDR and HDR video coding technology proposal by Sony", Joint Video Experts Team (JVET) of ITU-T SG 16 WP 3, vol. 04, 2018, pp. 1-76, XP030151196, USA, Apr. 10-20, 2018.
English translation of Written opinion for PCT Application No. JP2019/005263, dated Apr. 23, 2019.
International Search Report for PCT Application No. PCT/JP2019/005263, dated Apr. 23, 2019.
R. Joshi et al., "High Efficiency Video Coding (HEVC) Screen Content Coding: Draft 5", Document JCTVC-V1005, Joint Collaborative Team on Video Coding (JCT-VC) of ITU-T SG 16 WP 3 and ISO/IEC JTC 1/SC 29/WG 11, 22nd Meeting: Geneva, CH, Oct. 15-21, 2015.
J. Pfaff et. al., "Intra-prediction modes based on neural networks", JVET-J0037-v1, Joint Video Experts Team (JVET) of ITU-T SG 16 WP 3 and ISO/IEC JTC 1/SC 29/WG 11, 10th Meeting: San Diego, US, Apr. 10-20, 2018.
P. Lin et. al., "Multiple reference line intra prediction based on JEM7.0", JVET-J0070, Joint Video Experts Team (JVET) of ITU-T SG 16 WP 3 and ISO/IEC JTC 1/SC 29/WG 11 10th Meeting: San Diego, US, Apr. 10-20, 2016.
Teruhiko Suzuki, Masaru Ikeda and Karl Sharman, "Description of SDR and HDR video coding technology proposal by Sony", Joint Video Experts Team (JVET) of ITU-T SG 16 WP 3 and ISO/IEC JTC 1/SC 29/WG 11, JVET-J0028, 10th Meeting: San Diego, US, Apr. 10-20, 2018, pp. I-III,9-10.
Liang Zhao et al., "Further Investigations on multi-line intra prediction", Joint Video Experts Team (JVET) of ITU-T SG 16 WP 3 and ISO/IEC JTC 1/SC 29/WG 11, JVET-J0065-v2. 10th Meeting: San Diego, US, Apr. 10-20, 2018, pp. 1-3.
Yao-Jan Chang et al., "Arbitrary reference tier for intra directional modes", Joint Video Experts Team (JVET) of ITU-T SG 16 WP 3 and ISO/IEC JTC 1/SC 29/WG 11, JVET-C0043rl. 3rd Meeting: Geneva, CH, May 26-Jun. 1, 2016, pp. 1-5.
United States Office Communication for U.S. Appl. No. 17/254,937 dated Dec. 24, 2021.
United States Office Communication for U.S. Appl. No. 17/254,937 dated May 23, 2022.
United States Office Communication for U.S. Appl. No. 17/254,937 dated Aug. 4, 2022.
KR Office Action for KR Application No. 10-2022-7029102, dated Apr. 14, 2023 with English Translation.

* cited by examiner

VIDEO ENCODING OR DECODING APPARATUS, VIDEO ENCODING OR DECODING METHOD, PROGRAM, AND RECORDING MEDIUM

CROSS-REFERENCE TO RELATED APPLICATIONS

The present application is a continuation application of U.S. patent application Ser. No. 17/254,937 filed on Dec. 22, 2020, which is a National Stage Entry of international application PCT/JP2019/005263 filed on Feb. 14, 2019, which claims the benefit of priority from Japanese Patent Application No. 2018-120872 filed on Jun. 26, 2018, the disclosures of all of which are incorporated in their entirety by reference herein.

BACKGROUND

Technical Field

The present invention relates to video encoding or decoding apparatus, a video encoding or decoding method, a program for video encoding or decoding process, and a recording medium.

Background Art

In intra-prediction coding, an intra-predicted image is generated from reconstructed images adjacent to the block to be processed. For example, according to the HEVC (High Efficiency Video Coding) standard described in non-patent literature 1, an intra-predicted image is generated by configuring reconstructed images that correspond to 1 pixel adjacent to the block to be processed in the left direction, and 1 pixel likewise adjacent in the upper direction, as a reference range.

CITATION LIST

Non-Patent Literature

Non-Patent Literature 1: R. Joshi et al., "High Efficiency Video Coding (HEVC) Screen Content Coding: Draft 5", Document JCTVC-V1005, Joint Collaborative Team on Video Coding (JCT-VC) of ITU-T SG 16 WP 3 and ISO/IEC JTC 1/SC 29/WG 11, 22nd Meeting: Geneva, CH, 15-21 Oct. 2015.

SUMMARY

Technical Problem

However, there is a problem that, when the use range of images for use in intra-prediction is expanded, the requirement for the size of line buffers for use in the video encoding apparatus and the video decoding apparatus increases depending on how much that range expands. Consequently, it is desirable to adaptively control the use range of images for use in intra-prediction.

It is therefore an example object of the present invention to provide video encoding or decoding apparatus, a video encoding or decoding method, a program, and a recording medium that make it possible to adaptively control the use range of images for use in intra-prediction.

Solution to Problem

According to one example aspect of the present invention, video encoding or video decoding apparatus includes a control section configured to control a partial range to be equal to or less than a predetermined maximum range, based on a relationship between a position of a candidate image for use in intra-prediction for a block to be processed and a position of a unit having the block to be processed, the partial range being for use in the intra-prediction beyond an end portion of the unit in a predetermined direction in a use range of an image for use in the intra-prediction.

According to one example aspect of the present invention, a video encoding or video decoding method includes controlling a partial range to be equal to or less than a predetermined maximum range, based on a relationship between a position of a candidate image for use in intra-prediction for a block to be processed and a position of a unit having the block to be processed, the partial range being for use in the intra-prediction beyond an end portion of the unit in a predetermined direction in a use range of an image for use in the intra-prediction.

According to one example aspect of the present invention, a program that causes a processor to execute a video encoding or decoding process including controlling a partial range to be equal to or less than a predetermined maximum range, based on a relationship between a position of a candidate image for use in intra-prediction for a block to be processed and a position of a unit having the block to be processed, the partial range being for use in the intra-prediction beyond an end portion of the unit in a predetermined direction in a use range of an image for use in the intra-prediction.

According to one example aspect of the present invention, a non-transitory computer readable recording medium storing a program that causes a processor to execute a video encoding or decoding process including controlling a partial range to be equal to or less than a predetermined maximum range, based on a relationship between a position of a candidate image for use in intra-prediction for a block to be processed and a position of a unit having the block to be processed, the partial range being for use in the intra-prediction beyond an end portion of the unit in a predetermined direction in a use range of an image for use in the intra-prediction.

Advantageous Effects of Invention

According to one example aspect of the present invention, it is possible to adaptively control the use range of images for use in intra-prediction. Note that, according to the present invention, instead of or together with the above advantageous effect, other advantageous effects may be brought about as well.

DESCRIPTION OF THE EXAMPLE EMBODIMENTS

Hereinafter, example embodiments of the present invention will be described in detail with reference to the accompanying drawings. Note that, in the Specification and drawings, elements that can be described in the same or similar terms will be assigned the same reference signs, and overlapping description may be omitted.

The description will be given in the following order:
1. Related Arts
2. Summary of Example Embodiments
3. First Example Embodiment
3.1. Configuration of Intra-Prediction Apparatus 100
3.2. Technical Features
3.3. Specific Example
3.4. Example Application
3.5. Example Alteration
4. Second Example Embodiment
4.1. Configuration
4.2. Technical Feature
5. Other Example Embodiments 1. Related Arts As an art that relates to example embodiments of the present invention, intra-prediction that is performed in video encoding and video decoding processes will be described.

As described in following reference literature 1, for example, with the intra-prediction coding according to the HEVC (High Efficiency Video Coding) standard, an intra-predicted image is generated from reconstructed images adjacent to the block to be processed.

Reference Literature 1: R. Joshi et. al., "High Efficiency Video Coding (HEVC) Screen Content Coding: Draft 5", Document JCTVC-V1005, Joint Collaborative Team on Video Coding (JCT-VC) of ITU-T SG 16 WP 3 and ISO/IEC JTC 1/SC 29/WG 11, 22nd Meeting: Geneva, CH, 15-21 Oct. 2015.

Figure 1:
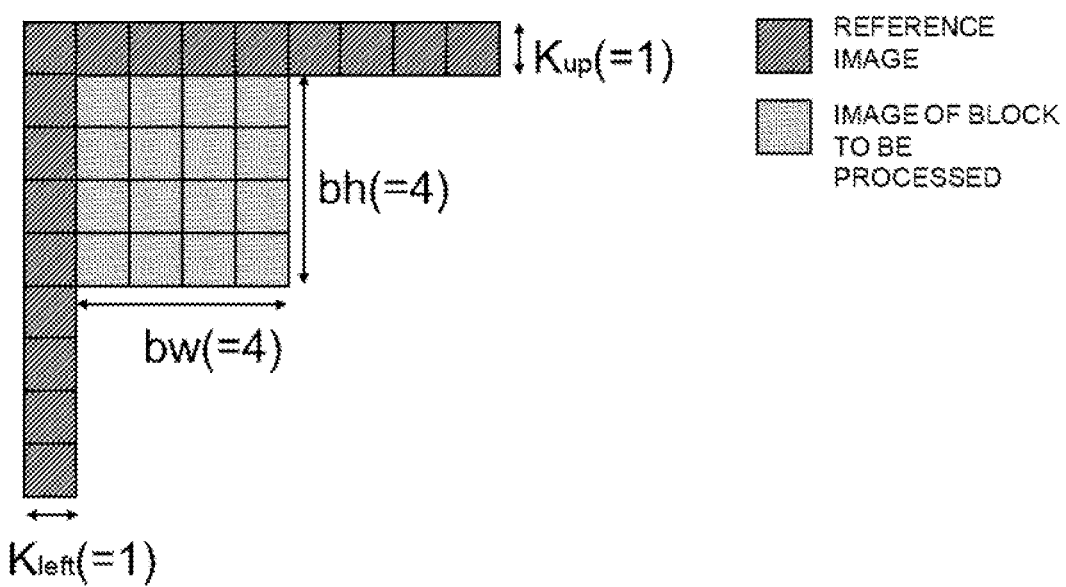
FIG. 1 is a diagram to show a specific example of reconstructed images for use in intra-prediction, according to the above-mentioned HEVC standard, for a block that is to be processed and comprised of 4 horizontal pixels "bw" and 4 vertical pixels "Bh"

FIG. 1 is a diagram to show a specific example of reconstructed images for use in intra-prediction, according to the above-mentioned HEVC standard, for a block that is to be processed and comprised of 4 horizontal pixels "bw" and 4 vertical pixels "Bh". Also, as shown in FIG. 1, the reference range of reconstructed images to be referenced for intra-prediction is 1 pixel in the left direction Kleft and 1 pixel in the upper direction Kup.

Also, in following reference literatures 2 and 3, proposals are made to expand the reference range for use in intra-prediction in order to improve the efficiency of prediction in intra-prediction.

Reference Literature 2: J. Pfaff et. al., "Intra-prediction modes based on neural networks", JVET-J0037, Joint Video Experts Team (JVET) of ITU-T SG 16 WP 3 and ISO/IEC JTC 1/SC 29/WG 11 10th Meeting: San Diego, US, 10-20 Apr. 2018.

Reference Literature 3: P. Lin et. al., "Multiple reference line intra-prediction based on JEM7.0", JVET-J0070, Joint Video Experts Team (JVET) of ITU-T SG 16 WP 3 and ISO/IEC JTC 1/SC 29/WG 11 10th Meeting: San Diego, US, 10-20 Apr. 2018.

Figure 2:
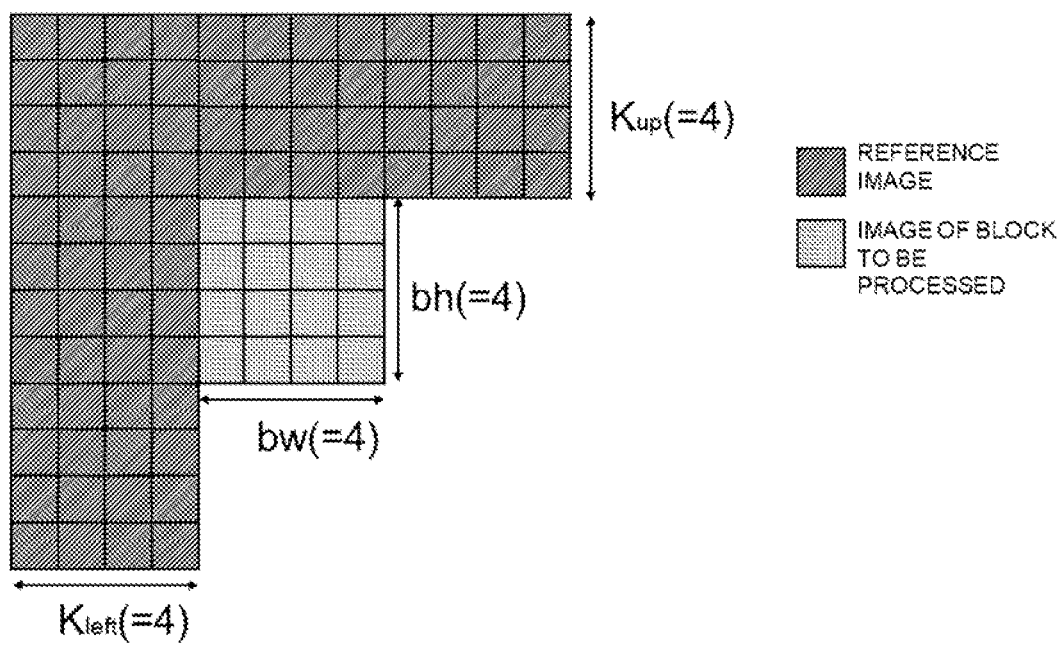
FIG. 2 is a diagram to show a specific example of an expanded reference range for a block that is to be processed and comprised of 4 horizontal pixels bw and 4 vertical pixels Bh.

FIG. 2 is a diagram to show a specific example of an expanded reference range for a block that is to be processed and comprised of 4 horizontal pixels bw and 4 vertical pixels Bh. As shown in FIG. 2, the reference range of reconstructed images to be referenced is 4 pixels in the left direction Kleft and 4 pixels in the upper direction Kup.

2. Summary of Example Embodiments

First, a summary of example embodiments of the present invention will be described.

(1) Technical Issue As mentioned earlier, there is a problem that, when the use range of images for use in intra-prediction (reference range) is expanded, the requirement for the size of line buffers to use in the video encoding apparatus and the video decoding apparatus increases.

To be more specific, let the number of horizontal pixels in the picture to encode be w pixels and the pixel bit precision be bitDepth bits, if the range Kup of reference images for use in intra-prediction in the upper direction is expanded from 1 pixel to 4 pixels, the requirement for line buffer size increases from w*bitDepth bits to w*bitDepth*4 bits. Consequently, it is desirable to adaptively control the use range of images for use in intra-prediction.

It is therefore an example object of the present example embodiment to adaptively control the use range of images for use in intra-prediction.

(2) Technical Feature

In an example embodiment according to one example aspect of the present invention, for example, a partial range is controlled to be equal to or less than a predetermined maximum range, based on the relationship between the position of a candidate image for use in intra-prediction for a block to be processed and the position of the unit where the block to be processed belongs, the partial range being for use in the intra-prediction beyond the end portion of the unit in a predetermined direction in the use range of images for use in the intra-prediction.

By this means, for example, it is possible to adaptively control the use range of images for use in intra-prediction.

Note that the above-described technical feature is one specific example pertaining to an example embodiment of the present invention, and, obviously, example embodiments of the present invention are not limited to the above-described technical feature.

3. First Example Embodiment

A first example embodiment of the present invention will be described below with reference to FIG. 3 to FIG. 11.

<3.1. Configuration of Intra-Prediction Apparatus 100>

Figure 3:
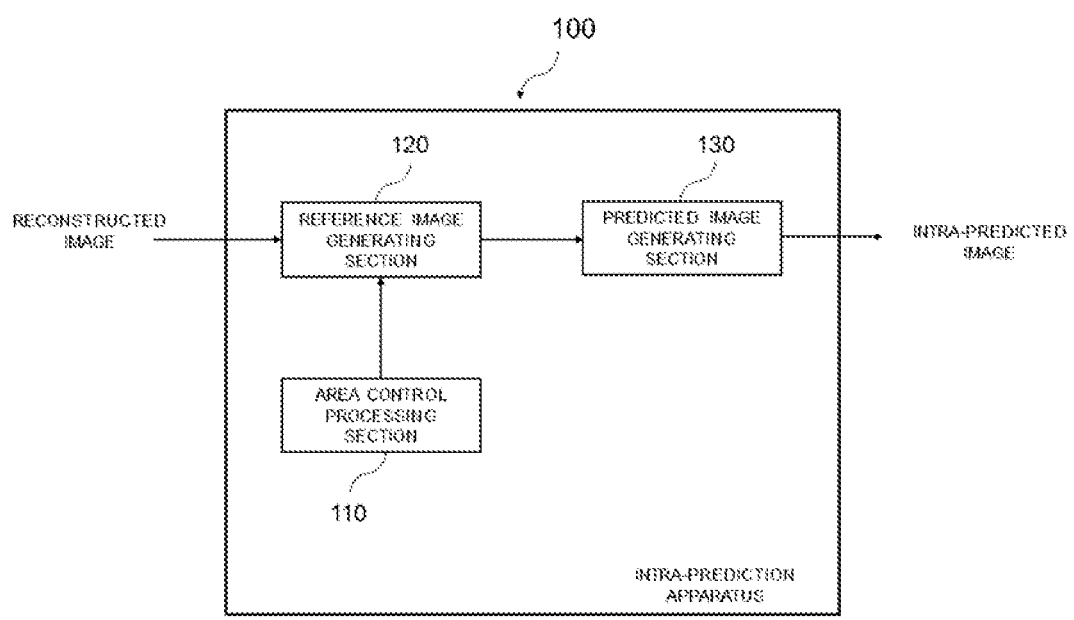
FIG. 3 is an explanatory diagram to show an example of a schematic configuration of intra-prediction apparatus 100 according to an example embodiment of the present invention.

An example configuration of intra-prediction apparatus 100 according to the first example embodiment will be described, with reference to FIG. 3. FIG. 3 is an explanatory diagram to show an example of a schematic configuration of the intra-prediction apparatus 100 according to an example embodiment of the present invention. Referring to FIG. 3, the intra-prediction apparatus 100 includes an area control processing section 110, a reference image generating section 120, and a predicted image generating section 130.

With the intra-prediction apparatus 100 configured as described above, the area control processing section 110 controls the use range (reference range) of images (reconstructed images) for use in intra-prediction. The reference image generating section 120 generates reference images from reconstructed images based on the use range controlled by the area control processing section 110. The predicted image generating section 130 generates predicted images from the reference images generated by the reference image generating section 120.

Figure 4:
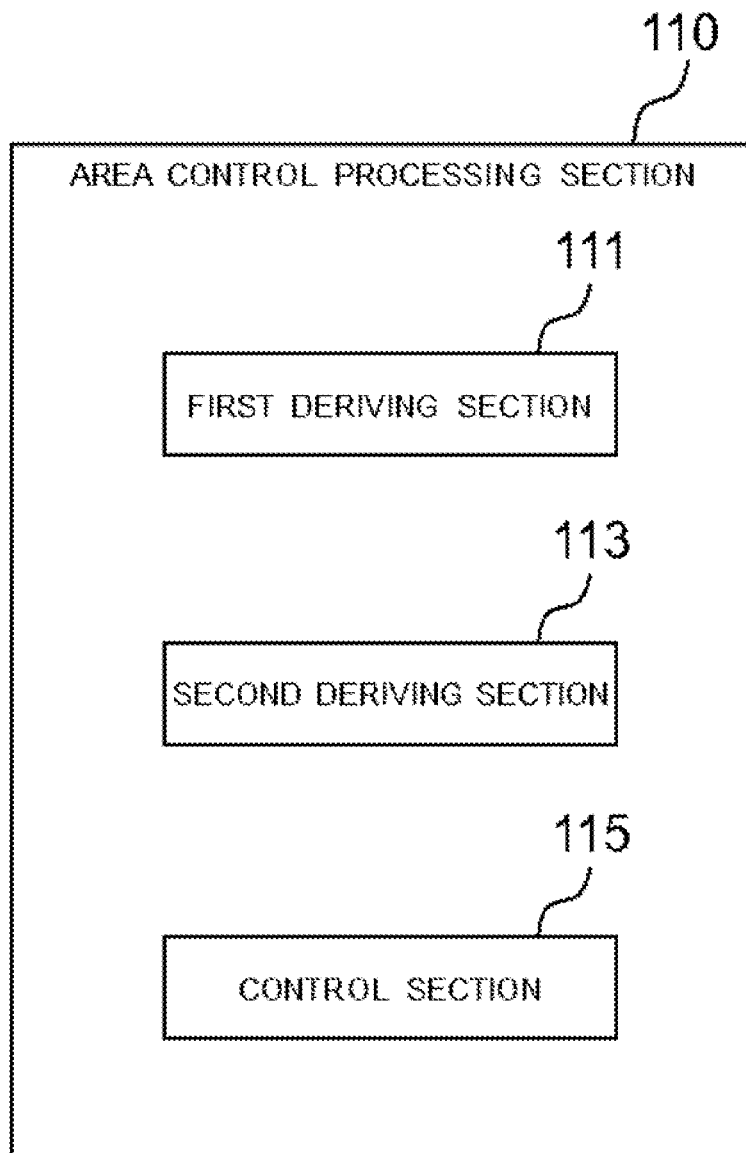
FIG. 4 is a block diagram to show an example of a schematic configuration of an area control processing section 110 according to a first example embodiment.

An example configuration of the area control processing section 110 will be described below with reference to FIG. 4. FIG. 4 is a block diagram to show an example of a schematic configuration of the area control processing section 110 according to the first example embodiment. Referring to FIG. 4, the area control processing section 110 includes a first deriving section 111, a second deriving section 113, and a control section 115. What specific operations are performed in each section will be described below.

<3.2. Technical Features>

Next, the technical features of the first example embodiment will be described below.

The area control processing section 110 (control section 115) controls a partial range to be equal to or less than a predetermined maximum range, based on the relationship between the position of a candidate image for use in intra-prediction for a block to be processed and the position of the unit where the block to be processed belongs, the partial range being for use in the intra-prediction beyond the end portion of the unit in a predetermined direction in the use range of images for use in the intra-prediction.

The predetermined direction may be any direction such as the upper direction in the picture or the left direction in the picture, but the following description will be given primarily assuming that the predetermined direction refers to the upper direction in the picture.

(1) Unit

The unit includes a syntax structure for encoding pixel samples. Among other things, the unit is one coding tree unit included in a slice. Note that the unit includes the block to be processed, as described above, and therefore can be regarded as a parent block. The unit may be referred to as a "parent block".

(2) Predetermined Maximum Range

To be more specific, the predetermined maximum range is the maximum range that can be used for intra-prediction beyond the end portion of the coding tree unit in the predetermined direction.

For example, if the predetermined direction is the upper direction in the picture, the predetermined maximum range is the maximum range that can be used (can be referenced) for intra-prediction, from the upper end portion toward the upper direction in the picture, with reference to the upper end portion of the coding tree unit.

(3) Derivation and Application of First Boundary Position

The area control processing section 110 (first deriving section 111) derives a first boundary position based on the position of the coding tree unit and the predetermined maximum range. The first boundary position is an image position that can be used for the intra-prediction beyond the end portion of the coding tree unit in the predetermined direction and is farthest from the coding tree unit in the predetermined direction.

For example, if the predetermined direction is the upper direction in the picture, the area control processing section 110 (first deriving section 111) derives the farthest position in the upper direction in the picture, as the first boundary position, with reference to the upper end portion of the coding tree unit, based on the position of the upper end portion of the coding tree unit and the predetermined maximum range.

When the first boundary position is derived in this way, the area control processing section 110 (control section 115) controls the partial range for use in the intra-prediction beyond the end portion of the coding tree unit in the predetermined direction to be equal to or less than the predetermined maximum range, based on the relationship between the position of the candidate image for use in the intra-prediction and the first boundary position.

For example, when candidate images for use in intra-prediction include a candidate image that is farther than the first boundary position, viewed from the position of the block to be processed, the area control processing section 110 (control section 115) controls the partial range to be equal to or less than the predetermined maximum range.

(4) Derivation and Application of Second Boundary Position

The area control processing section 110 (second deriving section 113) derives a second boundary position based on the position of the block to be processed and a candidate range of candidate images for use in the intra-prediction in the predetermined direction, the second boundary position being the position of a candidate image for use in the intra-prediction and being farthest from the block to be processed in the predetermined direction.

For example, if the predetermined direction is the upper direction in the picture, the area control processing section 110 (second deriving section 113) derives the candidate position of the farthest candidate image in the upper direction in the picture, as a second boundary position, with reference to the upper end portion of the block to be processed, based on the position of the upper end portion of the block to be processed and the candidate range of candidate images for use in the intra-prediction in the upper direction in the picture.

When the second boundary position is derived in this way, the area control processing section 110 (control section 115) controls the partial range for use in the intra-prediction beyond the end portion of the coding tree unit in the predetermined direction to be equal to or less than the predetermined maximum range, based on the relationship between the first and second boundary positions.

To be more specific, the area control processing section 110 (control section 115) controls the partial range for use in the intra-prediction beyond the end portion of the coding tree unit in the predetermined direction to be equal to or less than the predetermined maximum range, when the second boundary position is farther than the first boundary position in the predetermined direction with respect to the position of the block to be processed.

For example, in the event the predetermined direction is the upper direction in the picture, the area control processing section 110 (control section 115) controls the partial range below the predetermined maximum range when the second boundary position is farther than the first boundary position in the upper direction in the picture, with respect to the position of the upper end portion of the block to be processed.

Also, the area control processing section 110 (control section 115) controls the partial range for use in the intra-prediction beyond the end portion of the coding tree unit in the predetermined direction to the candidate range, when the second boundary position is not farther than the first boundary position in the predetermined direction with respect to the position of the block to be processed.

For example, if the predetermined direction is the upper direction in the picture, the area control processing section 110 (control section 115) controls the partial range to the candidate range, when the second boundary position is not farther than the first boundary position in the predetermined direction with respect to the position of the block to be processed.

<3.3. Specific Example>

Next, specific examples of the process performed in the intra-prediction apparatus 100 will be described below.

(1) Area Control Processing Section 110

Figure 5:
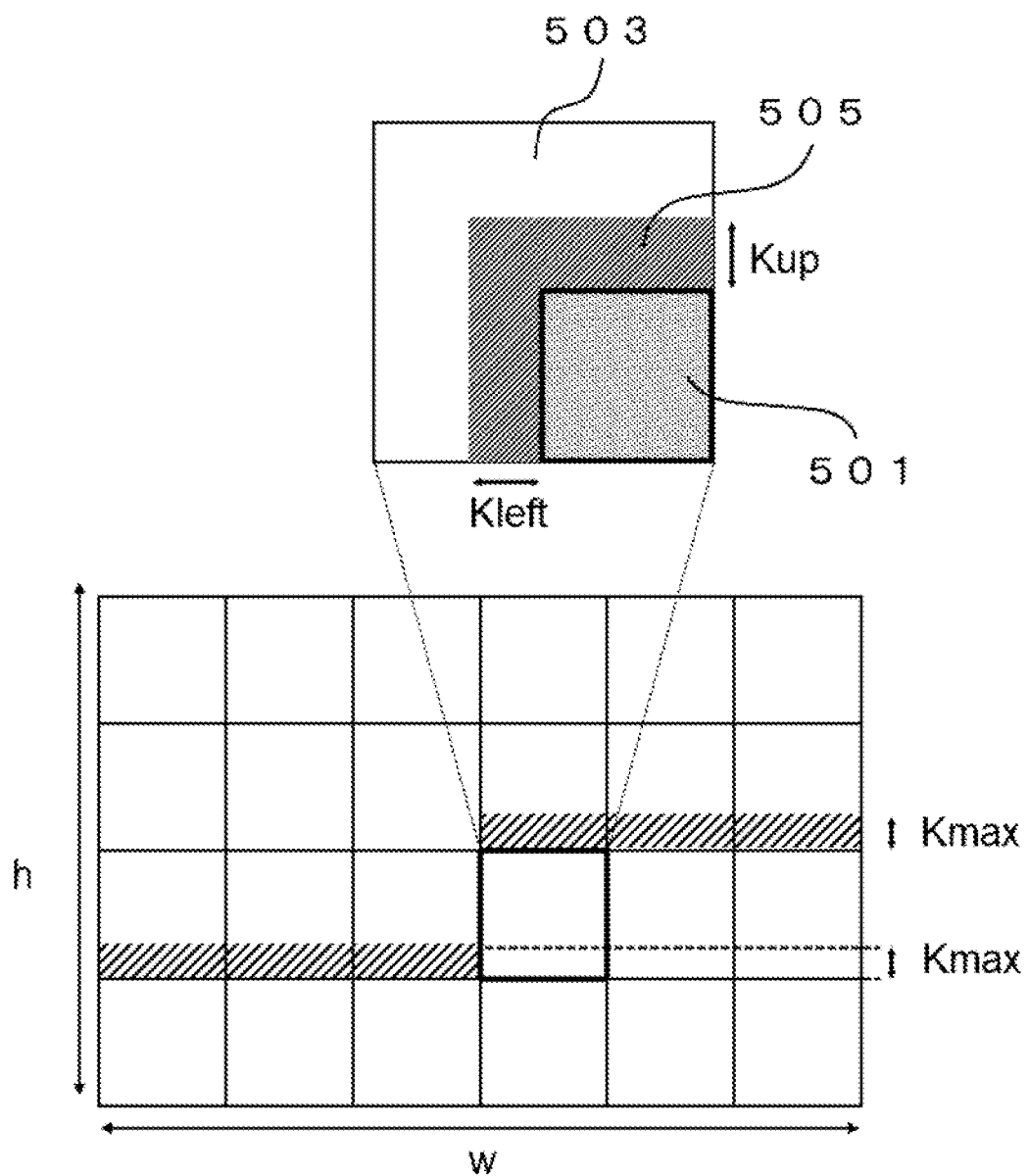
FIG. 5 is a diagram to explain a specific example of a process related to the area control processing section 110.

A specific example of the process related to the area control processing section 110 will be described below. FIG. 5 is a diagram to explain a specific example of a process related to the area control processing section 110.

First, the following variables will be defined.

As shown in FIG. 5, a predetermined maximum range that can be used (can be referenced) beyond the upper end portion of a coding tree unit 503, where the processing target block 501 belongs, in the upper direction in the picture, is Kmax pixels. In addition, the candidate range of the candidate image 505 (reference image) for use in the intra-prediction of the processing target block 501 in the upper direction in the picture is Kup pixels, and the candidate range in the left direction in the picture is Kleft pixels. Note that, with the present specific example, for ease of explanation, Kmax is less than Kup.

The use range that the area control processing section 110 (control section 115) adaptively controls, that is, the use range of images (reconstructed images) for use in the intra-prediction of the processing target block 501 in the upper direction in the picture is K pixels.

A picture will be defined as follows. The left upper end portion of a picture is the origin (x,y)=(0,0) of the horizontal and vertical coordinate system, the right direction in the picture is +x direction, and the lower direction in the picture is +y direction. In addition, the number of horizontal pixels in the picture is w pixels, and the number of vertical pixels is h pixels.

Next, the block to be processed will be defined as follows. First, the coordinates of the upper left corner position of the block to be processed are (cur_bx, cur_by). Furthermore, the number of horizontal pixels of the image block to be processed is cur_bw pixels, and the number of vertical pixels is cur_bh pixels.

Next, the coding tree unit will be defined as follows. The coordinates of the upper left corner position of the coding tree unit is (cur_cux, cur_cuy). The number of horizontal pixels of the coding tree unit is cuw pixels, and the number of vertical pixels is cuh pixels.

In addition, for ease of explanation, cur_bw and cur_bh are less than cuw and cuh, respectively. Furthermore, as described earlier, the left upper end portion of the picture is the origin (0,0) of the horizontal and vertical coordinate system, and therefore cur_cux and cur_cuy are equal to or less than cur_bx and cur_by, respectively.

In the present specific example, by using the variables defined above, the candidate range K of images for use (reference) in intra-prediction (reconstructed image) is adaptively controlled based on the relationship between the candidate positions of images (reconstructed images) for use (reference) in the intra-prediction of the block to be processed and the position of the coding tree unit where the block to be processed belongs.

First, the area control processing section 110 (first deriving section 111) derives the vertical coordinate ref_max_pos_y of the first boundary position by using following formula 1:

$$\text{ref\_max\_pos\_}y = \text{cur\_by} - K\text{up} \quad (1)$$

Here, the vertical coordinate ref_max_pos_y of the first boundary position can be regarded as the maximum value of vertical positions that can be used (can be referenced) beyond the upper end portion of the coding tree unit in the upper direction in the picture.

Furthermore, the area control processing section 110 (second deriving section 113) derives the vertical coordinate cand_min_pos_y of the second boundary position by using following formula 2:

$$\text{cand\_min\_pos\_}y = \text{cur\_}cuy - K\text{max} \quad (2)$$

Here, as described earlier, the vertical coordinate axis y has positive values in the lower direction in the picture with the upper end of the picture being the origin, so that the vertical coordinate cand_min_pos_y of the second boundary position can be regarded as the minimum value of candidate positions of images (reconstructed images) for use (reference) in the intra-prediction of the block to be processed.

The area control processing section 110 (control section 115) adaptively controls the candidate range K by using the vertical coordinate ref_max_pos_y of the first boundary position and the vertical coordinate cand_min_pos_y of the second boundary position.

To be more specific, when cand_min_pos_y<ref_max_pos_y holds, the area control processing section 110 (control section 115) calculates the use range K by following formula 3, and controls the partial range for use for the intra-prediction beyond the upper end portion of the coding tree unit in the upper direction in the picture to be equal to or less than the predetermined range Kmax.

$$K = \text{cur\_by} - \text{cur\_}cuy + K\text{max} \quad (3)$$

Furthermore, the area control processing section 110 (control section 115) calculates the use range K by following formula (4) when cand_min_pos_y≥ref_max_pos_y holds.

$$K = K\text{up} \quad (4)$$

In this way, the area control processing section 110 (control section 115) can calculate the use range K based on the relationship between relative positions of the vertical coordinate ref_max_pos_y of the first boundary position and the vertical coordinate cand_min_pos_y of the second boundary position, and control the partial range to be equal to or less than Kmax.

Note that, in the horizontal and vertical coordinate system described above, the upper left end of the picture is the origin, but this is by no means limiting. For example, the upper end portion of the block to be processed may be the origin on the vertical coordinate axis. When the origin is determined in this way, the vertical coordinate of the second boundary position can be regarded as the maximum value of the candidate positions of images (reconstructed images) for use (reference) in the intra-prediction of the block to be processed.

(2) Reference Image Generating Section 120

The reference image generating section 120 generates an image (reference image) for use (reference) in intra-prediction based on the use range K calculated by the area control processing section 110, which has been described above.

To be more specific, the reference image generating section 120 copies images having vertical coordinate positions from cur_by−Kmax to cur_by−1 when K<Kup holds, and maps the copied images to respective positions corresponding to the vertical coordinate positions cur_by−Kup to cur_by−Kmax−1, to generate the image (reference image) for use (reference) in the intra-prediction.

In this way, the reference image generating section 120 can copy the reconstructed image of vertical position cur_by−Kmax−1, instead of the reconstructed images of vertical position cur_by−Kup to cur_by−Kmax−1 that cannot be referenced beyond the boundary of the coding tree unit in the upper direction, and use this copied image as a reference image. Note that the reconstructed images from vertical position cur_by−Kmax to cur_by−1 may be used as reference images on an as-is basis.

Furthermore, when K=Kup holds, there are no vertical positions that cannot be used (referenced) beyond the upper end portion of the coding tree unit in the upper direction in the picture, so that the reference image generating section 120 can use the reconstructed images of vertical position cur_by−Kup to cur_by−1 as reference images on an as-is basis.

(3) Predicted Image Generating Section 130

The predicted image generating section 130 generates an intra-predicted image from the reference image provided from the reference image generating section 120. Any arbitrary intra-predicted image generation process may be applied to the generation of intra-predicted images, such as, for example, the intra-predicted image generation process described in any of the above-described reference literature 1, reference literature 2, and reference literature 3.

(4) Process Flow Performed by Intra-Prediction Apparatus 100

Figure 6:
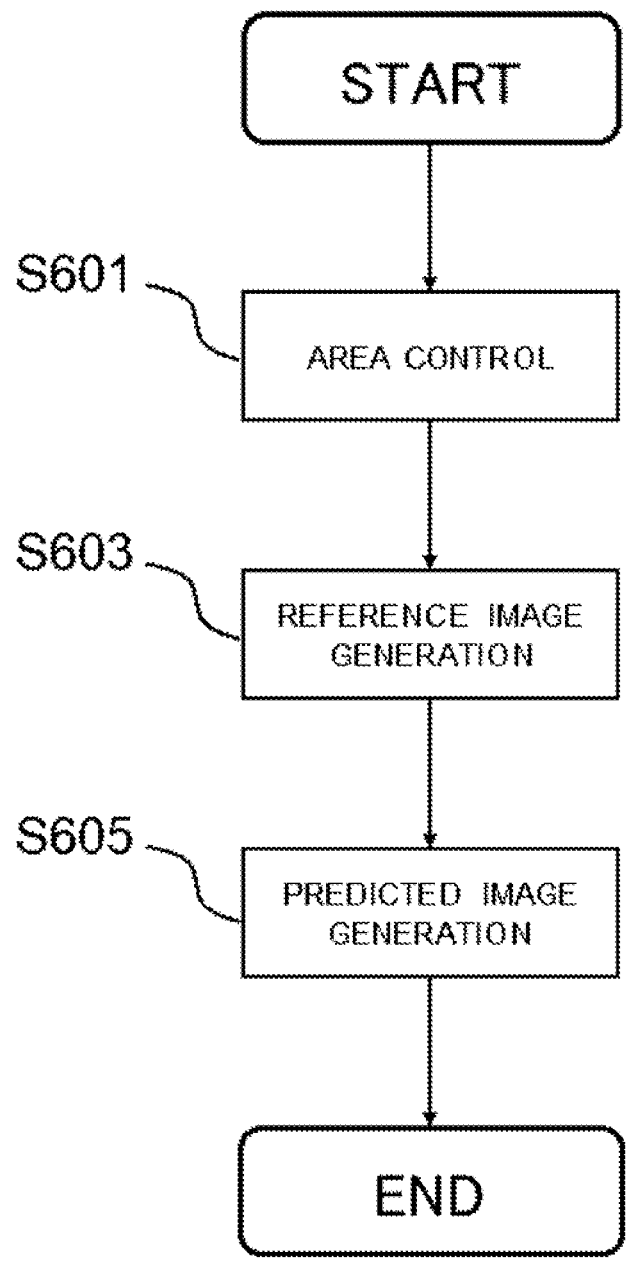
FIG. 6 is a flowchart to explain an example process flow as performed by the intra-prediction apparatus 100.

FIG. 6 is a flowchart to explain an example process flow as performed by the intra-prediction apparatus 100.

In step S601, the area control processing section 110 adaptively controls the candidate range K of images (reconstructed images) for use (reference) in intra-prediction based on the relationship between the candidate positions of reconstructed images to reference in the intra-prediction of the block to be processed and the position of the coding tree unit where the block to be processed belongs. Then, step S603 is performed.

In step S603, the reference image generating section 120 generates the reference image to use to generate an intra-predicted image of the block to be processed, based on relationship between Kmax and the value of K calculated in the area control processing section 110. Then, step S605 is performed.

In step S605, the predicted image generating section 130 generates an intra-predicted image of the block to be processed from the reference image provided from the reference image generating section 120.

(5) Effect According to the present example described above, for example, as shown in FIG. 7, the requirement for line buffer size can be reduced, by adaptively controlling the use range (reference range) of images (reconstructed images) for use in intra-prediction per block to be processed.

Figure 7A:
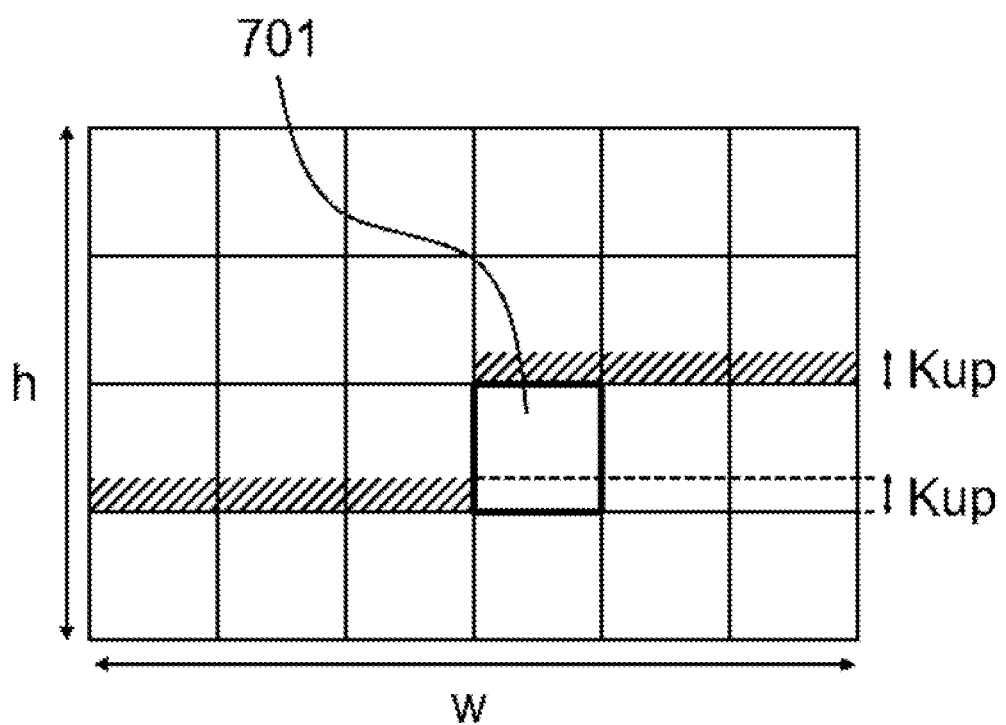
FIGS. 7(a) and 7(b) are diagrams to explain an effect according to an example of the first example embodiment.
Figure 7B:
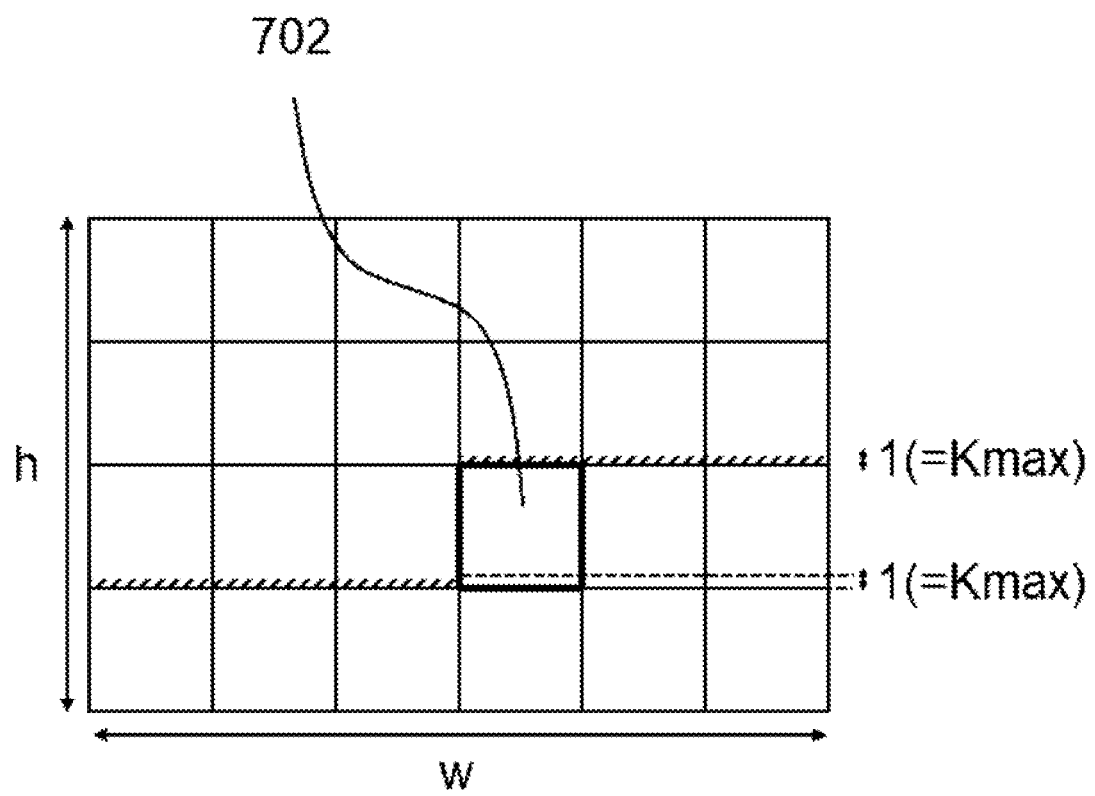

FIG. 7 are diagrams to explain an effect according to an example of the first example embodiment. First, FIG. 7(a) is a diagram to show an example (comparative example), in which the partial range for use beyond the end portion of a coding tree unit 701 is not limited to the predetermined maximum range Kmax or less. On the other hand, FIG. 7(b) is a diagram to illustrate an example (the present specific example), in which the partial range for use beyond the end portion of the coding tree unit 702 is limited to the predetermined maximum range Kmax or less.

In the comparative example shown in FIG. 7(a), the use range of images (reference images) in the upper direction in the picture is always Kup pixels on a line, so that the requirement for line buffer size is w*bitDepth*Kup bits.

On the other hand, referring to the example shown in FIG. 7(b), an example is shown here in which the predetermined maximum range is set to Kmax=1 to restrict the partial range in the use range K to pixels on one line. Therefore, in the present specific example shown in FIG. 7(b), w*bitDepth bit*1 holds. That is, with the present specific example shown in FIG. 7(b), the requirement for line buffer size can be reduced to w*bitDepth*(Kup−1), compared to the comparative example (the comparative example shown in FIG. 7(a)).

<3.4. Example Application>

(1) Video Encoding Apparatus 800

Figure 8:
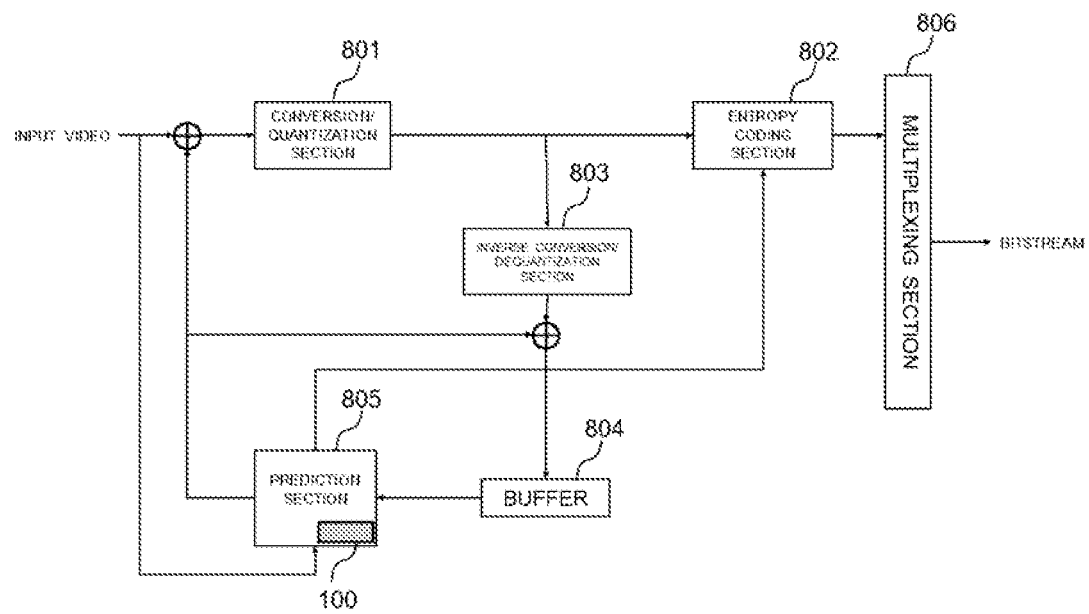
FIG. 8 is a block diagram to show a schematic configuration of video encoding apparatus 800.

The intra-prediction apparatus 100 described above can be applied to the video encoding apparatus 800 shown in FIG. 8, for example.

FIG. 8 is a block diagram to show a schematic configuration of the video encoding apparatus 800. As shown in FIG. 8, the video encoding apparatus 800 has a conversion/quantization section 801, an entropy coding section 802, an inverse conversion/dequantization section 803, a buffer 804, a prediction section 805, which includes the intra-prediction apparatus 100, and a multiplexing section 806.

First, the prediction section 805 generates a predicted signal for an input image signal, on a per block basis. To be more specific, when performing intra-prediction for a block to be processed, as described above, the intra-prediction apparatus 100 generates a predicted signal for the block to be processed.

The conversion/quantization section 801 frequency-converts a prediction error image, which is obtained by subtracting the predicted signal from the input image signal. Furthermore, the conversion/quantization section 801 quantizes the frequency-converted prediction error image (conversion coefficients).

The entropy coding section 802 entropy-encodes the converted quantized values, and difference information of motion vectors, which is a prediction parameter the prediction section 805 uses, and so forth, based on, for example, CABAC (Context-based Adaptive Binary Arithmetic Coding).

The inverse conversion/dequantization section 803 dequantizes the converted quantized values. Furthermore, the inverse conversion/dequantization section 803 inverse-frequency-converts the frequency conversion coefficients that have been dequantized. The predicted signal is added to the reconstructed prediction error image that has been inverse-frequency-converted, and the result is provided to the buffer 804. The buffer 804 stores the reconstructed image.

The multiplexing section 806 multiplexes a codeword provided from the entropy coding section 802 as a bitstream.

While the video encoding apparatus 800 generates bitstreams following the above-described operations, the intra-prediction apparatus 100 included in the prediction section 805 adaptively controls the use range of images (reference images) for use in intra-prediction, per block to be processed. This makes it possible to output video-encoded bitstreams while reducing the requirement for line buffer size.

Figure 9:
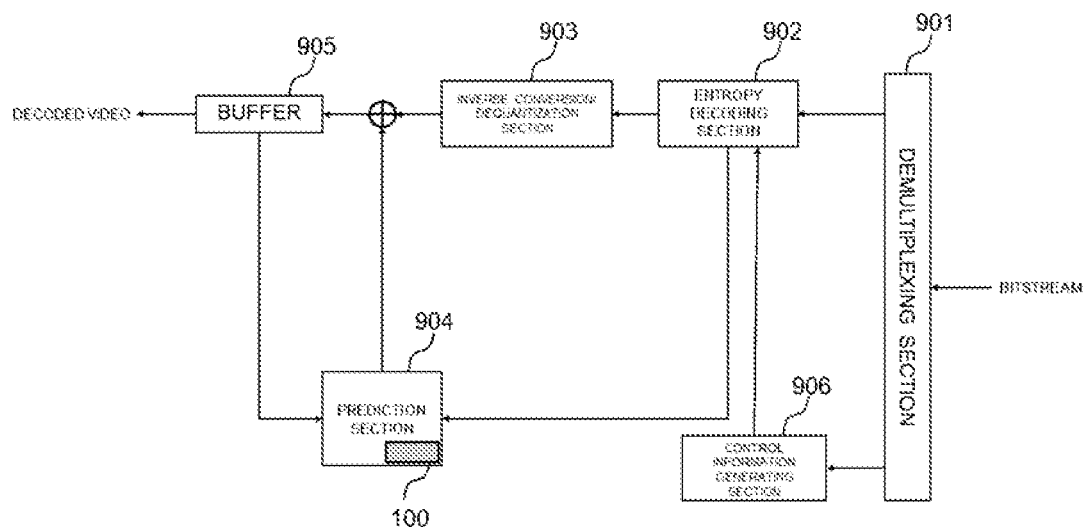
FIG. 9 is a block diagram to show a schematic configuration of video decoding apparatus 900.

(2) Video Decoding Apparatus 900 The intra-prediction apparatus 100 described above can be applied to, for example, the video decoding apparatus 900 shown in FIG. 9.

FIG. 9 is a block diagram to show a schematic configuration of the video decoding apparatus 900. As shown in FIG. 9, the video decoding apparatus 900 has a demultiplexing section 901, an entropy decoding section 902, an inverse conversion/dequantization section 903, a prediction section 904, which includes the intra-prediction apparatus 100 described above, a buffer 905, and a control information generating section 906.

The demultiplexing section 901 demultiplexes an input bitstream, and extracts the codeword.

The entropy decoding section 902 entropy-decodes the codeword extracted in the demultiplexing section 901 based on, for example, CABAC. The converted quantized values that have been entropy-decoded in the entropy decoding section 902 is provided to the inverse conversion/dequantization section 903. In addition, motion vector difference information and the like are provided to the prediction section 904.

The inverse conversion/dequantization section 903 dequantizes the converted quantized values in the quantization step size. Furthermore, the inverse conversion/dequantization section 903 inverse-frequency-converts the frequency conversion coefficients that have been de-quantized.

The prediction section 904 generates predicted signals on a per block basis. When performing intra-prediction for a block to be processed, as described above, the intra-prediction apparatus 100 generates a predicted signal for the block to be processed.

The predicted signal provided from the prediction section 904 is added to the reconstructed prediction error image that has been inverse-frequency-converted in the inverse conversion/dequantization section 903, and the resulting reconstructed picture is provided to the buffer 905. Then, the reconstructed picture stored in the buffer 905 is output as a decoded image.

While the video decoding apparatus 900 generates decoded images from bitstreams following the above-described operations, the intra-prediction apparatus 100 included in the prediction section 904 adaptively controls the use range (reference range) of images (reconstructed images) for use in intra-prediction is controlled adaptively, per block to be processed. This makes it possible to generate decoded images from bitstreams while reducing the requirement for line buffer size.

(3) Information Processing System 1000

Figure 10:
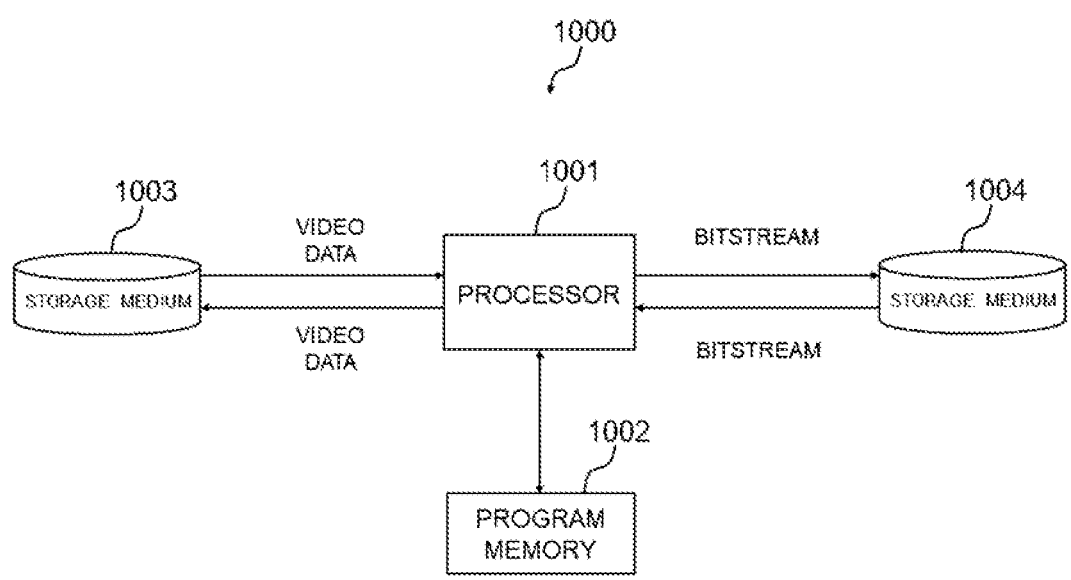
FIG. 10 is a block diagram to show a schematic configuration of an information processing system 1000 to which the intra-prediction apparatus 100 is applied.

The intra-prediction apparatus 100 described above may be implemented by the information processing system 1000 shown in FIG. 10, for example.

FIG. 10 is a block diagram to show a schematic configuration of the information processing system 1000, to which the intra-prediction apparatus 100 is applied.

The information processing system 1000 has, as shown in FIG. 10, a processor 1001, a program memory 1002, a storage medium 1003 for storing video data, and a storage medium 1004 for storing bitstreams. The storage medium 1003 and the storage medium 1004 may be separate storage media, or may be a storage area formed with the same storage medium. Magnetic storage media such as hard disk can be used as storage media.

The information processing system 1000 adaptively controls the use range (reference range) of images (reconstructed images) for use in intra-prediction, for every block to be processed, by installing a computer program that implements the functions of the intra-prediction apparatus 100 in the program memory 1002. This makes it possible to generate decoded images from bitstreams while reducing the requirement for line buffer size.

Figure 11:
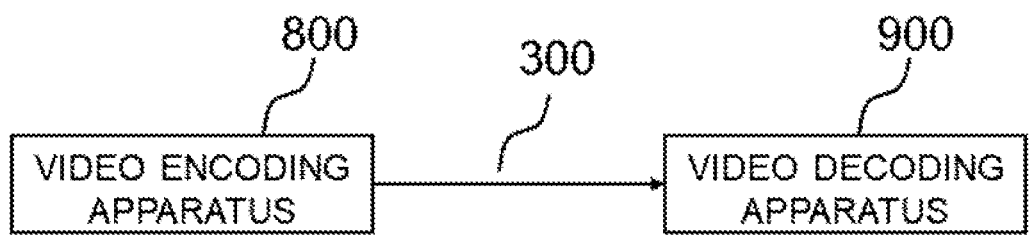
FIG. 11 is a diagram to show a system, in which the above-mentioned video encoding apparatus 800 and the above-mentioned video decoding apparatus 900 are connected through a transmission path 300 such as a wireless transmission path or a wired transmission path.

(4) Interoperability FIG. 11 is a diagram to show a system, in which the above-described video encoding apparatus 800 and the above-described video decoding apparatus 900 are connected through a transmission path 300 such as a wireless transmission path or a wired transmission path.

In the system shown in FIG. 11, the video encoding apparatus 800 and the video decoding apparatus 900 adaptively control the range of reference images for use in intra-prediction, for each block to be processed, following common procedures, such as, for example, using common Kmax, Kup, Kleft and so forth, so that the interoperability between the video encoding apparatus 800 and the video decoding apparatus 900 can be ensured.

To be more specific, for the predetermined maximum value Kmax, a fixed value that is common to the video encoding apparatus 800 and the video decoding apparatus 900 can be used. Furthermore, the predetermined maximum value Kmax may be a variable value that is set, on an implicit basis, based on the number of horizontal and vertical pixels of the picture, and so forth, and, for example, smaller values may be set as the number of pixels in the picture increases.

As described above, if the predetermined maximum value Kmax is a variable value, the predetermined maximum value Kmax does not necessarily have to be set implicitly. For example, a value may be signaled explicitly as a syntax element of a bitstream. That is, information to specify the predetermined maximum range Kmax may be included in a bitstream as a syntax element. The information to specify the predetermined maximum range Kmax may be included, for example, per sequence, per picture, per slice, per unit, and so forth.

Furthermore, the candidate ranges Kup and Kleft may be variable values. In this case, the candidate ranges Kup and Kleft may be explicitly signaled as syntax elements of a bitstream.

<3.5. Example Alternation>

In the present example embodiment, for images for use in intra-prediction, the use range in the upper direction in the picture is adaptively controlled, for each block to be processed, but this is by no means limiting, and, similarly, the use range in the left direction in the picture may be adaptively controlled.

To be more specific, the area control processing section 110 of the intra-prediction apparatus 100 (control section 115) may control the partial range for use in intra-prediction beyond the left end portion of the unit in the left direction in the picture, in the use range of images for use in intra-prediction, to be equal to or less than a predetermined maximum range. In this example alternation, the predetermined maximum range is, to be more specific, the maximum range that can be used in intra-prediction beyond the left end portion of the coding tree unit in the left direction in the picture.

Furthermore, information for specifying the predetermined maximum range may be signaled from the video encoding apparatus 800 to the video decoding apparatus 900 as a syntax element of a bitstream.

4. Second Example Embodiment

Next, a second example embodiment of the present invention will be described below with reference to FIG. 12 and FIG. 13. Although the first example embodiment described above is a specific example embodiment, the second example embodiment is a more generalized example embodiment.

<4.1. Configuration>

Figure 12:
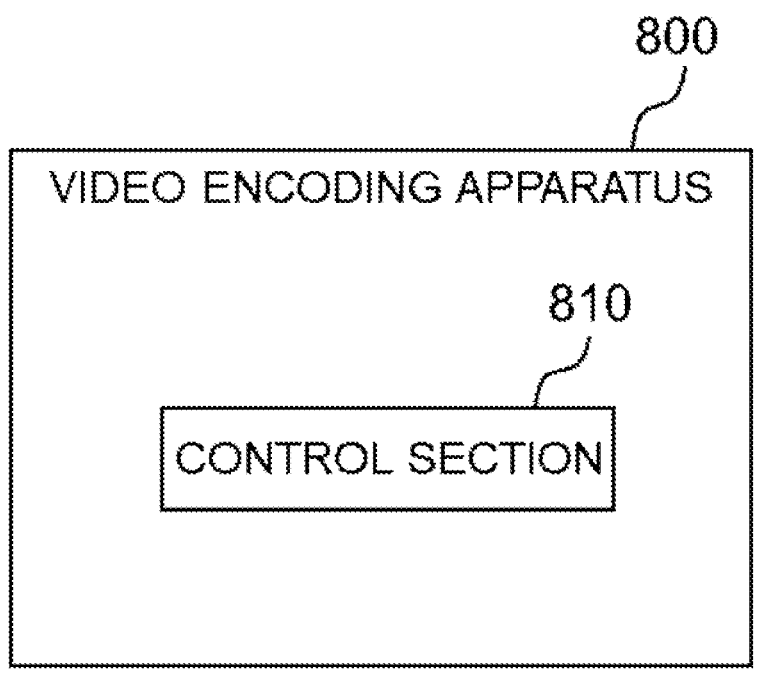
FIG. 12 is a block diagram to show an example of a schematic configuration of the video encoding apparatus 800 according to a second example embodiment.

FIG. 12 is a block diagram to show an example of a schematic configuration of the video encoding device 800 according to the second example embodiment. Referring to FIG. 12, the video encoding apparatus 800 includes a control section 810.

Figure 13:
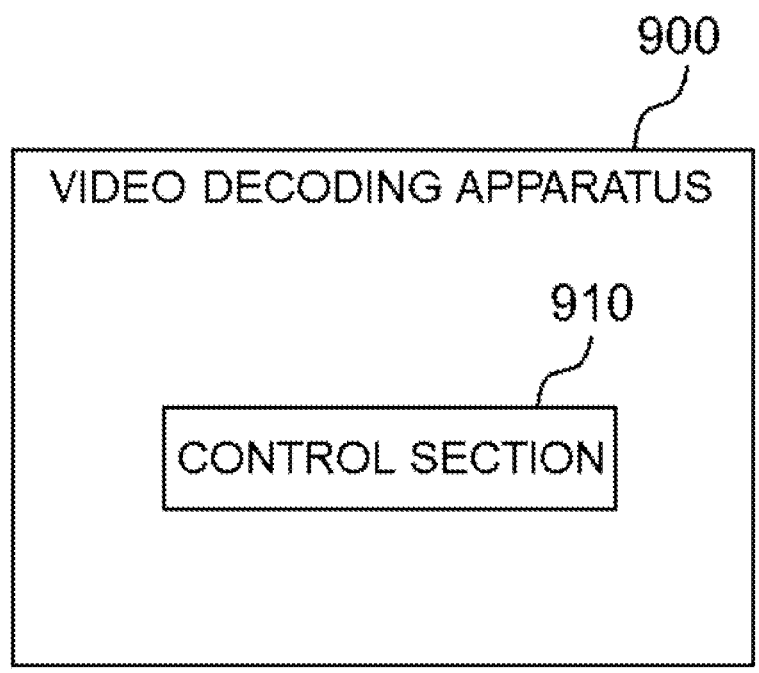
FIG. 13 is a block diagram to show an example of a schematic configuration of the decoding apparatus 900 according to the second example embodiment.

FIG. 13 is a block diagram to show an example of a schematic configuration of the video decoding apparatus 900 according to the second example embodiment. Referring to FIG. 13, the video decoding apparatus 900 includes a control section 910.

<4.2. Technical Feature>

Next, the technical feature of the second example embodiment will be described below.

With the second example embodiment, the video encoding apparatus 800 (control section 810) controls a partial range to be equal to or less than a predetermined maximum range, based on the relationship between the position of a candidate image for use in intra-prediction for a block to be processed and the position of the unit where the block to be processed belongs, the partial range being for use in the intra-prediction beyond the end portion of the unit in a predetermined direction in the use range of images for use in the intra-prediction.

For example, the video encoding apparatus 800 may perform the operations of the intra-prediction apparatus 100 according to the first example embodiment.

Also, the video decoding apparatus 900 (control section 910) controls the partial range to be equal to or less than a predetermined maximum range, based on the relationship between the position of a candidate image for use in intra-prediction for a block to be processed and the position of the unit where the block to be processed belongs, the partial range being for use in the intra-prediction beyond the end portion of the unit in a predetermined direction in the use range of images for use in the intra-prediction.

For example, the video decoding apparatus 900 may perform the operations of the intra-prediction apparatus 100 according to the first example embodiment.

The second example embodiment has been described above. According to the second example embodiment, for example, it is possible to adaptively control the use range of images for use in intra-prediction.

5. Other Example Embodiments

Although example embodiments of the present invention have been described above, the present invention is by no means limited to these example embodiments. It will be understood by those of ordinary skill in the art that these example embodiments are simply examples, and that a variety of changes can be made without departing from the scope and spirit of the present invention.

For example, the steps in the processes described in the Specification do not necessarily have to be executed in chronological order in accordance with the order described in the sequence diagram. For example, the steps in the processes may be executed in an order different from the order illustrated in the sequence diagram, or may be executed in parallel. Also, some of the steps in the processes may be deleted, or additional steps may be attached to the processes.

Also, a method to include the processes of the components (for example, the first deriving section, the second deriving section, and/or the control section) described in the Specification may be provided, and a program to cause a processor to execute the processes of these components may be provided. Also, a non-transitory computer-readable recording medium that records this program may be provided. Obviously, such apparatus, module, method, program, and non-transitory computer-readable recording medium are included in the present invention.

Some of or all of the example embodiments can be described as in the following supplementary notes, but are not limited to the following.

(Supplementary Note 1)

A video encoding or decoding apparatus comprising:
a control section configured to control a partial range to be equal to or less than a predetermined maximum range, based on a relationship between a position of a candidate image for use in intra-prediction for a block to be processed and a position of a unit having the block to be processed, the partial range being for use in the intra-prediction beyond an end portion of the unit in a predetermined direction in a use range of an image for use in the intra-prediction.

(Supplementary Note 2)

The video encoding or decoding apparatus according to supplementary note 1, wherein the unit includes a syntax structure for encoding a pixel sample.

(Supplementary Note 3)

The video encoding or decoding apparatus according to supplementary note 1 or 2, wherein the unit is a coding tree unit included in a slice.

(Supplementary Note 4)

The video encoding or decoding apparatus according to any one of supplementary notes 1 to 3, wherein the predetermined maximum range is a maximum range that can be used for the intra-prediction beyond the end portion of the unit in the predetermined direction.

(Supplementary Note 5)

The video encoding or decoding apparatus according to supplementary note 4, further comprising a first deriving section configured to derive a first boundary position based on the position of the unit and the predetermined maximum range, the first boundary position being an image position that can be used for the intra-prediction beyond the end portion of the unit in the predetermined direction, and being farthest from the unit in the predetermined direction, wherein the control section is configured to control the partial range for use in the intra-prediction beyond the end portion of the unit in the predetermined direction to be equal to or less than the predetermined maximum range, based on the relationship between the position of the candidate image for use in the intra-prediction and the first boundary position.

(Supplementary Note 6)

The video encoding or decoding apparatus according to supplementary note 5, further comprising a second deriving section configured to derive a second boundary position based on the position of the block to be processed and a candidate range of the candidate image for use in the intra-prediction in the predetermined direction, the second boundary position being a position of the candidate image for use in the intra-prediction and being farthest from the block to be processed in the predetermined direction, wherein the control section is configured to control the partial range for use in the intra-prediction beyond the end portion of the unit in the predetermined direction to be equal to or less than the predetermined maximum range, based on a relationship between the first and the second boundary positions.

(Supplementary Note 7)

The video encoding or decoding apparatus according to supplementary note 6, wherein the control section is configured to control the partial range for use in the intra-prediction beyond the end portion of the unit in the predetermined direction to be equal to or less than the predetermined maximum range, when the second boundary position is farther than the first boundary position in the predetermined direction with respect to the position of the block to be processed.

(Supplementary Note 8)

The video encoding or decoding apparatus according to supplementary note 6 or 7, wherein the control section is configured to control the use range of the image for use in the intra-prediction to the candidate range, when the second boundary position is not farther than the first boundary position in the predetermined direction with respect to the position of the block to be processed.

(Supplementary Note 9)

The video encoding or decoding apparatus according to any one of supplementary notes 6 to 8, wherein:

the predetermined direction is an upper direction in the picture;

the predetermined maximum range is a maximum range Kmax that can be used for the intra-prediction beyond an upper end portion of the unit in the upper direction in the picture;

the candidate range is a candidate range Kup of a candidate image for use in the intra-prediction in the upper direction in the picture;

the first deriving section is configured to derive a vertical coordinate ref_max_pos_y of the first boundary position by using following formula 1, based on a vertical coordinate axis having a positive value in a lower direction in the picture, with an upper end of the picture being an origin;

the second deriving section is configured to derive a vertical coordinate cand_min_pos_y of the second boundary position by using following formula 2, based on the vertical coordinate axis; and the control section is configured to calculate a use range K of an image for use in the intra-prediction in the upper direction in the picture by using following formula 3 when cand_min_pos_y<ref_max_pos_y holds, and control the partial range for use in the intra-prediction beyond the end portion of the unit in the predetermined direction to be equal to or less than the predetermined maximum range Kmax:

$$\text{ref\_max\_pos\_}y = \text{cur\_by} - K\text{up} \qquad \text{(Formula 1)},$$

where the cur_by is a vertical coordinate of the upper end portion of the unit;

$$\text{cand\_min\_pos\_}y = \text{cur\_}cuy - K\text{max} \qquad \text{(Formula 2)},$$

where the cur_cuy is a vertical coordinate of the upper end portion of the unit; and $$K = \text{cur\_by} - \text{cur\_}cuy + K\text{max} \qquad \text{(Formula 3)}.$$

(Supplementary Note 10)

The video encoding or decoding apparatus according to supplementary note 9, wherein the control section is configured to calculate the use range K of the image for use in the intra-prediction in the upper direction in the picture by using following formula 4 when cand_min_pos_y≥ref_max_pos_y holds:

$$K = K\text{up} \qquad \text{(Formula 4)}.$$

(Supplementary Note 11)

The video encoding or decoding apparatus according to supplementary note 9 or 10, further comprising an image generating section configured to generate an image for use in the intra-prediction based on the use range K of the image for use in the intra-prediction in the upper direction in the picture.

(Supplementary Note 12)

The video encoding or decoding apparatus according to supplementary note 11, wherein the image generating section is configured to copy images having vertical coordinate positions from cur_by−Kmax to cur_by−1 when K<Kup holds, and map the copied images to respective positions corresponding to the vertical coordinate positions cur_by −Kup to cur_by−Kmax−1, to generate the image for use in the intra-prediction.

(Supplementary Note 13)

A video encoding or decoding method comprising:

controlling a partial range to be equal to or less than a predetermined maximum range, based on a relationship between a position of a candidate image for use in intra-prediction for a block to be processed and a position of a unit having the block to be processed, the partial range being for use in the intra-prediction beyond an end portion of the unit in a predetermined direction in a use range of an image for use in the intra-prediction.

(Supplementary Note 14)

A program that causes a processor to execute a video encoding or decoding process including controlling a partial range to be equal to or less than a predetermined maximum range, based on a relationship between a position of a candidate image for use in intra-prediction for a block to be processed and a position of a unit having the block to be processed, the partial range being for use in the intra-prediction beyond an end portion of the unit in a predetermined direction in a use range of an image for use in the intra-prediction.

(Supplementary Note 15)

A non-transitory computer readable recording medium storing a program that causes a processor to execute a video encoding or decoding process including controlling a partial range to be equal to or less than a predetermined maximum range, based on a relationship between a position of a candidate image for use in intra-prediction for a block to be processed and a position of a unit having the block to be processed, the partial range being for use in the intra-prediction beyond an end portion of the unit in a predetermined direction in a use range of an image for use in the intra-prediction.

This application claims the priority on the basis of Japanese Patent Application No. 2018-120872, filed on Jun. 26, 2018, and its disclosure, including the Specification, drawings and abstract, is incorporated herein by reference in its entirety.

INDUSTRIAL APPLICABILITY

In a system for encoding or decoding video, it is possible to adaptively control the use range of images for use in intra-prediction.

REFERENCE SIGNS LIST

100 Intra-prediction apparatus
110 Area control processing section
111 First deriving section
113 Second deriving section
115, 810, 910 Control section
120 Reference image generating section
130 Predicted image generating section
800 Video encoding apparatus
900 Video decoding apparatus

What is claimed is:

1. A video encoding or decoding apparatus comprising:
a memory storing instructions; and one or more processors configured to execute the instructions to:
control a use range of an image for use in intra-prediction for a block to be equal to or less than a first maximum range if the image for use in intra-prediction for the block processed is located beyond an end portion of a coding tree unit in a predetermined direction, and
control the use range of the image for use in intra-prediction for the block to be equal to or less than a second maximum range if the image for use in intra-prediction for the block to be processed is not located beyond the end portion of the coding tree unit in the predetermined direction,
wherein the second maximum range is wider than the first maximum range,
wherein the use range comprises multiple lines when the use range is controlled to be equal to or less than the second maximum range, and
wherein all of the multiple lines are successively positioned and at least one of the multiple lines is used for intra-prediction for the block when the use range is controlled to be equal to or less than the second maximum range.

2. The video encoding or decoding apparatus according to claim 1, wherein a difference between the first maximum range and the second maximum range is larger than one sample.

3. The video encoding or decoding apparatus according to claim 1, wherein the one or more processors are configured to execute the instructions to control the use range to be a fixed value.

4. A method of video encoding or decoding, comprising:
controlling a use range of an image for use in intra-prediction for a block to be equal to or less than a first maximum range if the image for use in intra-prediction for the block processed is located beyond an end portion of a coding tree unit in a predetermined direction, and
controlling the use range of the image for use in intra-prediction for the block to be equal to or less than a second maximum range if the image for use in intra-prediction for the block to be processed is not located beyond the end portion of the coding tree unit in the predetermined direction,
wherein the second maximum range is wider than the first maximum range,
wherein the use range comprises multiple lines when the use range is controlled to be equal to or less than the second maximum range, and
wherein all of the multiple lines are successively positioned and at least one of the multiple lines is used for intra-prediction for the block when the use range is controlled to be equal to or less than the second maximum range.

5. The method according to claim 4, wherein a difference between the first maximum range and the second maximum range is larger than one sample.

6. The method according to claim 4, further comprising controlling the use range to be a fixed value.

7. A non-transitory computer-readable recording medium storing instructions which, when executed by one or more processors, cause the one or more processors to:
control a use range of an image for use in intra-prediction for a block to be equal to or less than a first maximum range if the image for use in intra-prediction for the block processed is located beyond an end portion of a coding tree unit in a predetermined direction, and
control the use range of the image for use in intra-prediction for the block to be equal to or less than a second maximum range if the image for use in intra-prediction for the block to be processed is not located beyond the end portion of the coding tree unit in the predetermined direction,
wherein the second maximum range is wider than the first maximum range,
wherein the use range comprises multiple lines when the use range is controlled to be equal to or less than the second maximum range, and
wherein all of the multiple lines are successively positioned and at least one of the multiple lines is used for intra-prediction for the block when the use range is controlled to be equal to or less than the second maximum range.

8. The non-transitory computer-readable recording medium of claim 7, wherein a difference between the first maximum range and the second maximum range is larger than one sample.

9. The non-transitory computer-readable recording medium of claim 7, wherein the stored instructions, when executed by one or more processors, cause the one or more processors to control the use range to be a fixed value.

* * * * *